United States Patent
Richman (10) Patent No.: US 10,178,432 B2
(45) Date of Patent: Jan. 8, 2019

(54) IDENTITY-BASED FACE AND VOICE RECOGNITION TO REGULATE CONTENT RIGHTS AND PARENTAL CONTROLS USING CONSUMER PROFILES

(71) Applicant: Sony Corporation, Tokyo (JP)

(72) Inventor: Steven Richman, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/599,193

(22) Filed: May 18, 2017

(65) Prior Publication Data

US 2018/0338178 A1    Nov. 22, 2018

(51) Int. Cl.
| | | |
|---|---|---|
| H04N 21/4415 | (2011.01) | |
| H04N 21/422 | (2011.01) | |
| H04N 21/4223 | (2011.01) | |
| H04N 21/4627 | (2011.01) | |
| H04N 21/4786 | (2011.01) | |
| H04N 21/478 | (2011.01) | |
| H04N 21/45 | (2011.01) | |
| G10L 17/00 | (2013.01) | |
| G06K 9/00 | (2006.01) | |

(Continued)

(52) U.S. Cl.
CPC ..... *H04N 21/4415* (2013.01); *G06K 9/00255* (2013.01); *G06K 9/00288* (2013.01); *G06K 9/00926* (2013.01); *G10L 17/005* (2013.01); *G10L 17/04* (2013.01); *H04N 5/23212* (2013.01); *H04N 21/4222* (2013.01); *H04N 21/4223* (2013.01); *H04N 21/42203* (2013.01); *H04N 21/4532* (2013.01); *H04N 21/4627* (2013.01); *H04N 21/4786* (2013.01); *H04N 21/47805* (2013.01); *H04N 21/47815* (2013.01)

(58) Field of Classification Search
CPC ......... H04N 21/4415; H04N 21/23212; H04N 21/42203; H04N 21/4222; H04N 21/4223; H04N 21/4532; H04N 21/4627; H04N 21/47805; H04N 21/47815; H04N 21/4786; G06K 9/00255; G06K 9/00288; G06K 9/00926; G10L 17/005; G10L 17/04

See application file for complete search history.

(56) References Cited

U.S. PATENT DOCUMENTS

| | | | |
|---|---|---|---|
| 9,218,813 | B2 | 12/2015 | Baldwin et al. |
| 9,697,822 | B1 * | 7/2017 | Naik ............... G10L 15/063 |

(Continued)

FOREIGN PATENT DOCUMENTS

EP        2953371 A1    12/2015

Primary Examiner — Chenea Smith
(74) Attorney, Agent, or Firm — John L. Rogitz (57) ABSTRACT

A viewer's rights to view content is determined instantly, without exposing any data externally, by capturing both a facial image and speech of the viewer. The data, which can be captured each viewing session, is matched to a secure profile which may have other security information assigned to it, such as service login IDs and passwords, or credit card numbers. If both the facial image and voice match respective templates, the viewer is allowed access to, e.g., cloud-based content (such as email) or is allowed to make a purchases within applications via account level access. Banking transactions may similarly be permitted upon face/voice match without the need to input a code. Personalization of content based on profiles recognized automatically during a viewing session is also facilitated.

19 Claims, 6 Drawing Sheets

Operating logic (51) Int. Cl.
  *H04N 5/232*   (2006.01)
  *G10L 17/04*   (2013.01)

(56) References Cited

U.S. PATENT DOCUMENTS

| | | | |
|---|---|---|---|
| 9,769,510 B2* | 9/2017 | Deen | H04N 21/25891 |
| 2003/0023444 A1* | 1/2003 | St. John | H04M 3/382 |
| | | | 704/270.1 |
| 2003/0028872 A1 | 2/2003 | Milovanovic et al. | |
| 2010/0299530 A1* | 11/2010 | Bell | G06F 21/32 |
| | | | 713/186 |
| 2011/0205016 A1* | 8/2011 | Al-Azem | G06F 21/32 |
| | | | 340/5.52 |
| 2012/0206236 A1* | 8/2012 | King | G06F 21/32 |
| | | | 340/5.83 |
| 2012/0293642 A1* | 11/2012 | Berini | G06F 21/32 |
| | | | 348/77 |
| 2014/0118520 A1* | 5/2014 | Slaby | G06K 9/00926 |
| | | | 348/77 |
| 2014/0129232 A1* | 5/2014 | Jones | G06Q 40/12 |
| | | | 704/275 |
| 2015/0248798 A1* | 9/2015 | Howe | G07C 9/00158 |
| | | | 340/5.83 |
| 2015/0254062 A1 | 9/2015 | Kim et al. | |
| 2016/0070898 A1 | 3/2016 | Kwok-Suzuki et al. | |
| 2016/0219049 A1* | 7/2016 | Headley | G06F 21/32 |
| 2016/0381285 A1* | 12/2016 | Aoki | H04N 5/23212 |
| | | | 348/345 |
| 2017/0070692 A1* | 3/2017 | Lin | H04N 5/2176 |

\* cited by examiner

FIG. 1

FIG. 2  Remote Control

FIG. 3 Example camera

FIG. 4  Account setup

FIG. 5  Audio template setup

FIG. 6  Face template setup

FIG. 7  Set up user interface

FIG. 8    Operating logic

IDENTITY-BASED FACE AND VOICE RECOGNITION TO REGULATE CONTENT RIGHTS AND PARENTAL CONTROLS USING CONSUMER PROFILES

FIELD

The present application relates to technically inventive, non-routine solutions that are necessarily rooted in computer technology and that produce concrete technical improvements.

BACKGROUND

Audio video display devices (AVDD) such as so-called "smart" TVs that are Internet-enabled typically provide for the creation of multiple user accounts. A user can sign into his account to configure the AVDD with the user's profile settings as associated with the user's account.

As understood herein, the level of analysis to identify a person for content security purposes should require a relatively high threshold of accuracy. However, identity-based viewing presently is not as widely used as controlling a TV using voice commands or face capture and has not recognized that security identification requires a relatively high threshold of accuracy.

SUMMARY

Present principles recognize that smart televisions can have the capability of capturing very high megapixel quality photos of viewers using cameras built into the bezels or attached to the bezels of the TVs. The remote controls of these TVs may also have the ability to receive voice commands by activating a button or by being connected to external hardware such as an Amazon Echo® with Alexa™ voice recognition. These Interactive Voice Response (IVR) systems are capable of converting voice to text and then using that text to execute commands or codes that apply to those text strings. Present principles use enhanced IVR voice capturing technologies and low noise camera sensors (such as complementary metal-oxide-semiconductor (CMOS) cameras with phase and contrast auto-focus) to determine a viewers' biometric details for voice and face. Then this voice and face biometric data is used to grant or deny access to security profiles for screening out inappropriate content, commercials, or games from being watch (parental control), for determining rights to view specific content, and for personalizing the experience to particular viewers habits.

Thus, present principles provide for determining a viewer's rights to view content instantly, without exposing any data externally, and used only to automate TV viewing, while the user has full control over the profile. The data captured each viewing session may be matched to a secure profile which may have other security information assigned to it These additional security elements (such as service login IDs and passwords, or credit card numbers) may allow for instant access to cloud based content (such as email) or making a purchases within apps (account level access). The combination of voice/face identity recognition and secure profile creation allows for a much easier way to watch TV without having to constantly input credentials in the open or logging into an online account every time a payment for an application, piece of content, or service is required. The user's security profile is established and stored in the TV, can be managed by the TV owner, and can even be securely signed by a digital certificate provider. For banking, present principles allow for transactions without inputting a mobile code. Personalization of content based on profiles recognized automatically during a viewing session is also facilitated.

Accordingly, a system includes at least one complementary metal-oxide-semiconductor (CMOS) camera with phase and/or contrast auto-focus. The system also includes at least one microphone and circuitry configured to receive at least one image from the camera, and compare the image to an image template associated with a first user. The circuitry is configured to receive a signal from the microphone and compare the signal to a voice template associated with the first user. Moreover, the circuitry is configured to, responsive to both the image satisfying a threshold criteria for matching the image template and the signal satisfying a threshold criteria for matching the voice template, grant access to the first user of at least one computer feature. The circuitry further is configured to, responsive to either the image not satisfying a threshold criteria for matching the image template or the signal not satisfying a threshold criteria for matching the voice template, not grant access to the first user of the at least one computer feature.

In some examples, the camera can be on the AVD, as can be the microphone. Or, the microphone can be on a remote control (RC). Yet again, the microphone can be on a digital voice assistant (DVA).

In non-limiting examples, the circuitry may be configured to establish the voice template at least in part by prompting a user to speak into the microphone. In more specific non-limiting examples, the circuitry may be configured to establish the voice template at least in part by prompting a user to speak predetermined words into the microphone. The circuitry also can be configured to establish the image template at least in part by prompting a user to look into the camera.

As examples, the computer feature may be a user account with a viewing profile associated with the first user. Or, the computer feature may be a user financial account.

In another aspect, an assembly includes at least one processor and at least one computer storage with instructions executable by the at least one processor for receiving at least one image from a camera. The instructions also are executable for comparing the image to an image template associated with a first user. Further, the instructions are executable for receiving a signal from a microphone and comparing the signal to a voice template associated with the first user. The instructions are further executable for, responsive to both the image matching the image template and the signal matching the voice template, granting access to the first user of at least one computer feature. In contrast, the instructions are executable for, responsive to either the image not matching the image template or the signal not matching the voice template, not granting access to the first user of the at least one computer feature.

In another aspect, a method includes determining whether speech matches a voice template associated with a user. The method further includes determining whether an image of a person matches a facial template associated with the user. The method includes granting the person access to an account of the user responsive to the speech matching the voice template and the image matching the facial template. On the other hand, the method includes not granting the person access to an account of the user responsive to the speech not matching the voice template or the image matching the facial template.

The details of the present disclosure, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Figure 1:
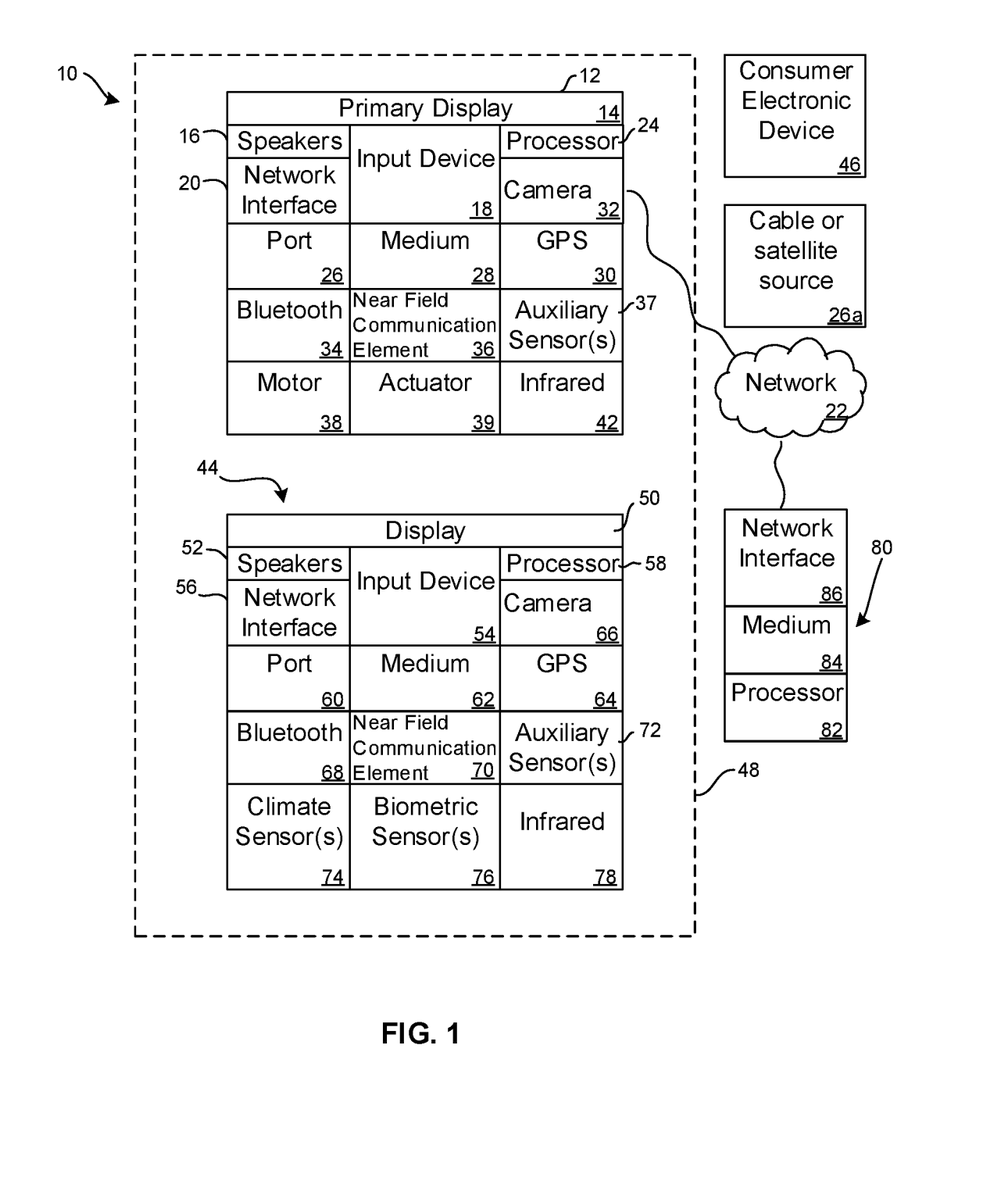
FIG. 1 is a block diagram of an example system including an example in consistent with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
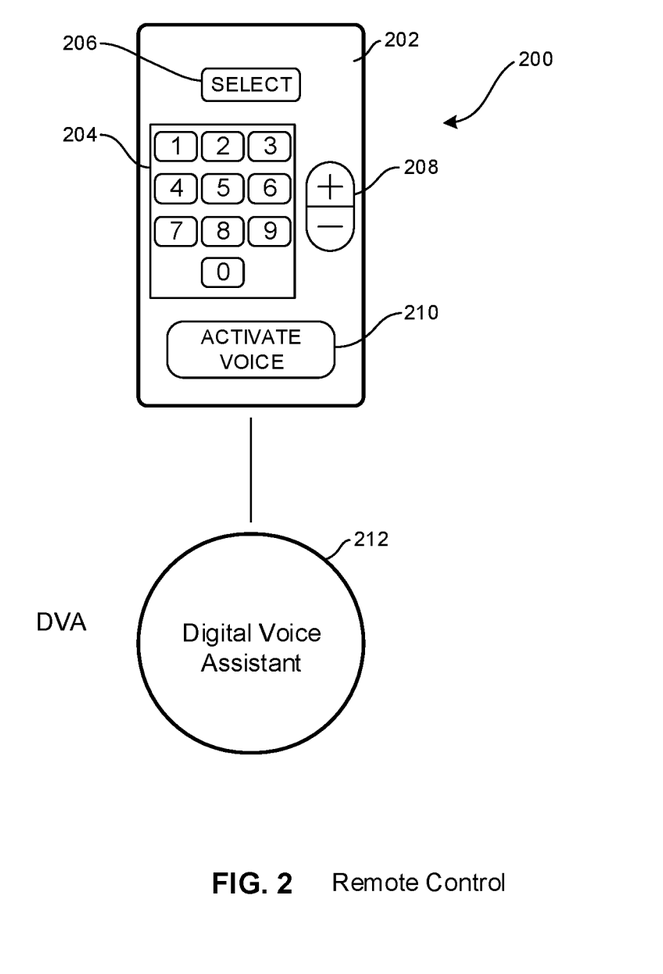
FIG. 2 is a plan view of an example remote control (RC) consistent with present principles, with a digital voice assistant (DVA) also shown.

FIG. 2 shows a remote control (RC) 200 that may include appropriate components of the above-described CE device 44. Thus, the RC 200 may include one or more internal processors, computer memories, and wireless transmitters such as IR command transmitters to control a device such as the AVDD 12.

As shown, the RC 200 includes a typically plastic, hand-holdable housing 202 with multiple input keys that can be manipulated by a person to cause wireless commands to be sent from the RC 200 to, e.g., the AVDD 12. For example, an alpha-numeric keypad 204 may be provided on the RC to input alpha-numeric signals to the AVDD 12, along with a select key 206 for entering a select or enter command. Volume up and down keys 208 may be provided for manipulation to respectively turn the volume of the speakers of the AVDD 12 up and down. An "activate voice" recognition key 210 may be provided and when toggled once may activate a microphone on the AVDD 12 and/or RC 200 to capture speech.

In addition or alternatively to the voice recognition key 210, the RC 200 and/or AVDD 12 may communicate with one or more digital voice assistants (DVA) 212 such as an Amazon Echo® or other DVA.

Figure 3:
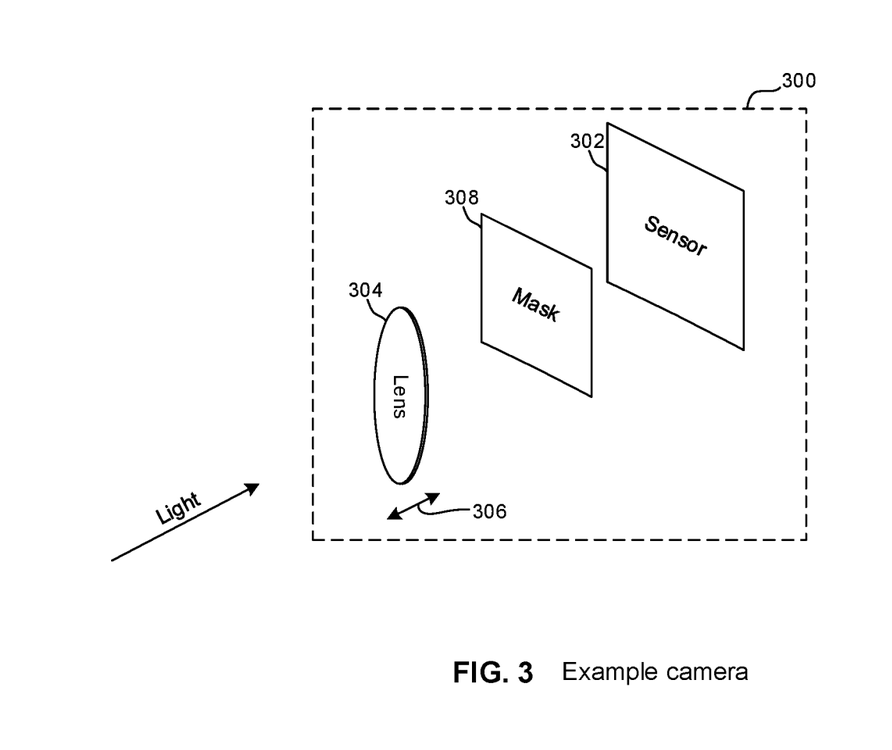
FIG. 3 is a schematic diagram of an example camera with auto-focus.

Turning to FIG. 3, an example camera 300, which may implement, for instance, either one or more of the cameras 32/66 shown in FIG. 1, may be a high resolution camera with auto-focus capability, the better to accurately obtain images of viewers for purposes to be described further below. As shown, the camera 300 can include an imaging sensor 302 such as a complementary metal-oxide-semiconductor (CMOS) sensor, although other sensors such as charge-coupled devices (CCDs) may also be used. Light passes through a focusing lens 304 that can move relative to the sensor as indicated by the arrows 306 to automatically focus images onto the sensor. In some embodiments a mask 308 may be positioned between the lens 304 and sensor 302 as shown.

The camera 300 may include phase detection (PD) auto-focus, in which incoming light is divided into pairs of images which are compared to each other to identify similar light intensity patterns, with a resulting error between the two images being determined to in turn determine whether the object being imaged is in a front focus or a back focus position. Using this determination, the lens 304 may be moved accordingly.

In addition or alternatively, contrast detection autofocus may be used. The lens 304 may be moved until a maximal contrast between adjacent pixels of the sensor 302 is detected.

Figure 4:
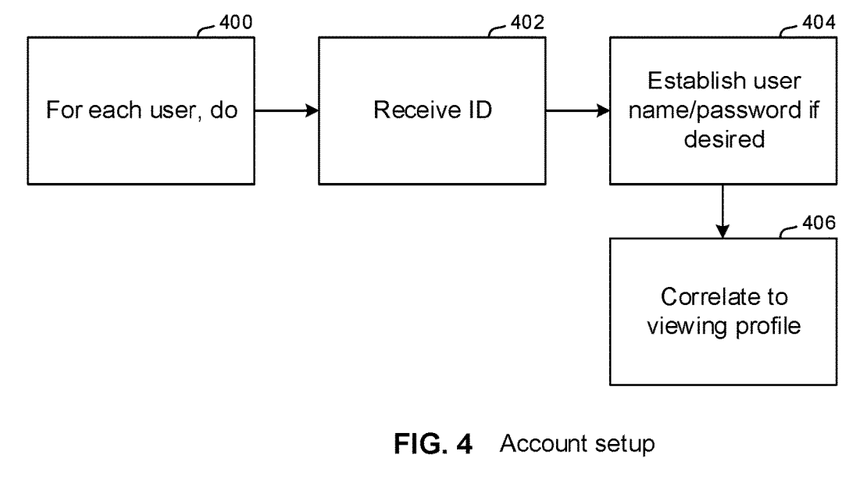
FIG. 4 is a flow chart of example account set up logic consistent with present principles.

With the above audio and video capturing devices in mind, attention is directed to FIG. 4. At block 400, for each of a plurality of users, the user's ID is received at block 402. A user name and password for the user may be established at block 404 by setup routines known in the art. For example, the AVDD 12 may prompt a user to manipulate the RC or other input device to input the data indicated in FIG. 4. This identifying data is then correlated to a viewing profile for the user at block 406. The correlation may be automatic based on learning the channels and times the user watches the AVDD according to profile learning techniques known in the art, or manual, in which the user inputs favorites to the AVDD, or a combination thereof.

Figure 5:
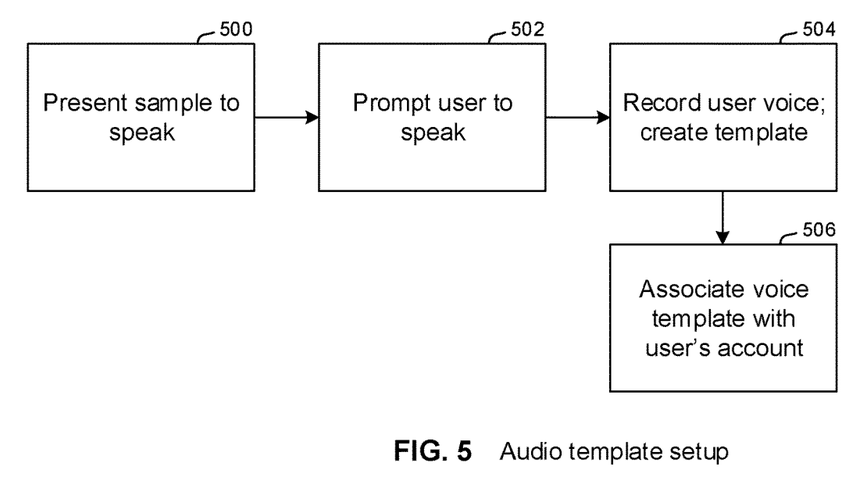
FIG. 5 is a flow chart of example audio template set up logic consistent with present principles.

Once user profiles are associated with respective users, the logic of FIG. 5 may be invoked. As shown, at block 500 a sample of speech may be audibly and/or visibly presented on, e.g., the AVDD 12. The user is then prompted at block 502 to speak the sample, with the user's voice speaking the sample being recorded at block 504 and used to establish an audio or speech template for purposes to be shortly disclosed. The template may include a digitization of the user's voice per se and/or data representing a "fingerprint" of the voice, such as spectral features of the spoken sound as derived using any one or more of frequency estimation, hidden Markov models, Gaussian mixture models, pattern matching algorithms, neural networks, matrix representation, vector quantization and decision trees. In example embodiments, the template is associated with the corresponding user's account at block 506.

Figure 6:
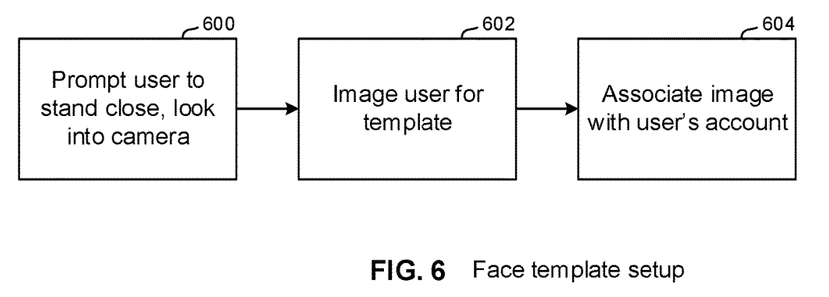
FIG. 6 is a flow chart of example face template set up logic consistent with present principles.

FIG. 6 illustrates logic for establishing a face template. Commencing at block 600, the user is prompted to stand close to the imaging camera and to look directly at it. The user is then imaged at block 602, with the image establishing a visual template and being associated with the respective user's account at block 604.

Figure 7:
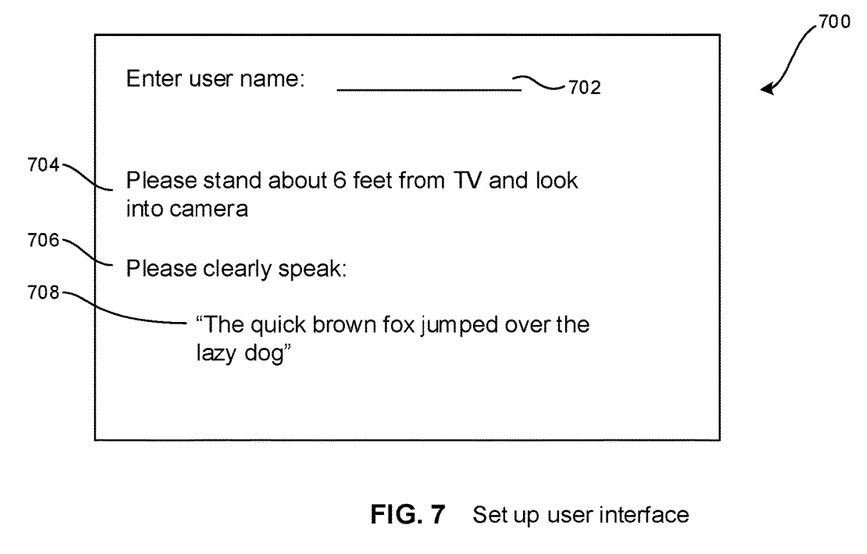
FIG. 7 is a screen shot of an example user interface (UI) consistent with present principles attendant to FIGS. 5 and 6.

FIG. 7 illustrates a setup user interface (UI) 700 which includes a field 702 for entering the user's name or other ID. A prompt 704 may be presented for the user to stand close to the camera (or, in the example, the device, a TV, on which the camera is located) and look into it. A second prompt 706 may be presented for the user to speak a predetermined phrase into the microphone of, e.g., the AVDD 12, in accordance with the logic described above.

Figure 8:
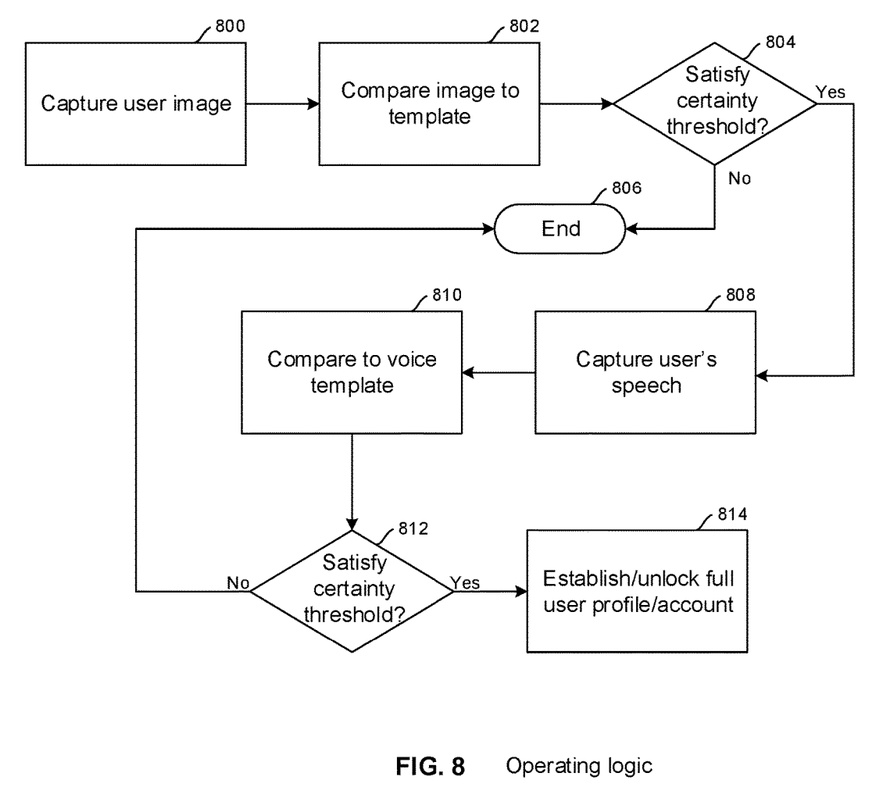
FIG. 8 is a flow chart of example operating logic consistent with present principles.

Once the user's speech template and visual template have been established, the logic of FIG. 8 may be executed, e.g., every time the AVDD 12 is energized and/or periodically thereafter. Commencing at block 800, an image of the user is captured using any of the cameras disclosed hereon. The image is compared to the image template derived in FIG. 6 (or to a series of image templates of multiple users) to determine whether a match within a certainty threshold is satisfied at decision diamond 804. If no match is found satisfying the certainty threshold, the logic may end at state 806, but if the image captured at block 800 satisfies the certainty threshold of matching the visual template generated in FIG. 6, the logic may proceed to block 808.

At block 808, the user's speech is captured. Moving to block 810, the speech is digitized and processed using the same algorithm that was used to generate the speech template from FIG. 5 to determine at decision diamond 812 whether a match of the speech captured at block 808 matches, within a certainty threshold, the speech template from FIG. 5. If it does not the logic may end, but otherwise the logic can proceed to block 814 to establish or unlock the user's full profile along with any permissions, parental settings, service login IDs and passwords, credit card numbers, etc. associated therewith.

While particular techniques are herein shown and described in detail, it is to be understood that the subject matter which is encompassed by the present application is limited only by the claims.

What is claimed is:

1. A system comprising:
at least one camera on an audio video device (AVD);
at least one microphone; and
circuitry configured to:
receive at least one image from the camera;
compare the image to an image template associated with a first user;
receive a signal from the microphone;
compare the signal to a voice template associated with the first user;
responsive to both the image satisfying a criteria for matching the image template and the signal satisfying a criteria for matching the voice template, grant access to the first user of at least one computer feature of the AVD;
responsive to either the image not satisfying a criteria for matching the image template or the signal not satisfying a criteria for matching the voice template, not grant access to the first user of the at least one computer feature;
the computer feature of the AVD comprising at least one security profile for screening out inappropriate content, commercials, and games from being watched, for determining rights to view specific content, and for personalizing viewing experience to the user, the circuitry being configured for determining the first user's rights to view content without exposing any data externally to automate TV viewing, while the first user has full control over the security profile, the security profile further being associated with a service login identification and password, at least one or credit card number to allow for instant access to cloud based content or making purchases within applications, wherein image and voice authentication and secure profile creation facilitates viewing content on the AVD without having to constantly input credentials in the open or logging into an online account every time a payment for an application, piece of content, or service is required.

2. The system of claim 1, wherein the microphone is on an audio video device.

3. The system of claim 1, wherein the microphone is on a remote control (RC).

4. The system of claim 1, wherein the microphone is on a digital voice assistant (DVA).

5. The system of claim 1, wherein the circuitry is configured to:
establish the voice template at least in part by prompting a user to speak into the microphone.

6. The system of claim 1, wherein the circuitry is configured to:
establish the voice template at least in part by prompting a user to speak predetermined words into the microphone.

7. The system of claim 1, wherein the circuitry is configured to:
establish the image template at least in part by prompting a user to look into the camera.

8. The system of claim 1, wherein the at least one computer feature is a user account with a viewing profile associated with the first user.

9. The system of claim 1, wherein the at least one computer feature is a user financial account.

10. An assembly comprising:
at least one processor; and
at least one computer storage with instructions executable by the at least one processor for:
receiving at least one image from a camera;
comparing the image to an image template associated with a first user;
activating voice recognition for receiving a signal from a microphone;
comparing the signal to a voice template associated with the first user;
responsive to both the image matching the image template and the signal matching the voice template, granting access to the first user of at least one computer feature of at least one audio video device (AVD);
responsive to either the image not matching the image template or the signal not matching the voice template, not granting access to the first user of the at least one computer feature, the computer feature of the AVD comprising at least one security profile for screening out inappropriate content, commercials, and games from being watched, for determining rights to view specific content, and for personalizing viewing experience to the user, the instructions being executable for determining the first user's rights to view content without exposing any data externally to automate TV viewing, while the first user has full control over the security profile, the security profile further being associated with a service login identification and password, at least one or credit card number to allow for instant access to cloud based content or making purchases within applications, wherein image and voice authentication and secure profile creation facilitates viewing content on the AVD without having to constantly input credentials in the open or logging into an online account every time a payment for an application, piece of content, or service is required.

11. The assembly of claim 10, wherein the camera includes at least one complementary metal-oxide-semiconductor (CMOS) camera with contrast auto-focus to establish a maximal contrast between adjacent pixels.

12. The assembly of claim 10, wherein the at least one computer feature includes access to a user profile for an audio video device (AVD).

13. The assembly of claim 12, wherein the camera is on the AVD.

14. The assembly of claim 12, wherein comparing the image to the image template and comparing the signal to the voice template are executed periodically after the AVD is energized.

15. The assembly of claim 10, wherein the microphone is on a remote control (RC).

16. The assembly of claim 10, wherein the microphone is on a digital voice assistant (DVA).

17. The assembly of claim 10, wherein the instructions are executable for:

establishing the voice template at least in part by prompting a user to speak predetermined words into the microphone.

18. The assembly of claim 10, wherein the at least one computer feature includes access to a user financial account.

19. A method, comprising:

determining, using at least one computer, whether speech matches a voice template associated with a user;

determining, using at least one computer, whether an image of a person matches a facial template associated with the user;

granting the person access to a computer-based account of the user responsive to the speech matching the voice template and the image matching the facial template;

not granting the person access to the account of the user responsive to the speech not matching the voice template or the image matching the facial template; and the account being associated with an audio video device (AVD) and comprising at least one security profile for screening out inappropriate content, commercials, and games from being watched, for determining rights to view specific content, and for personalizing viewing experience to the user, the method further determining the first user's rights to view content without exposing any data externally to automate TV viewing, while the first user has full control over the security profile, the security profile further being associated with a service login identification and password, at least one or credit card number to allow for instant access to cloud based content or making purchases within applications, wherein image and voice authentication and secure profile creation facilitates viewing content on the AVD without having to constantly input credentials in the open or logging into an online account every time a payment for an application, piece of content, or service is required.

* * * * *